United States Patent
Doerr et al.

(10) Patent No.: US 8,855,841 B2
(45) Date of Patent: Oct. 7, 2014

(54) METHOD FOR OPERATING AN ELECTRIC VEHICLE

(75) Inventors: Bernd Doerr, Wallduern (DE); Roland Schleser, Loewenstein (DE); Holger Niemann, Shanghai (CN); Markus Kretschmer, Murr (DE); Oliver Kaefer, Murr (DE); Daniel Damm, Ludwigsburg (DE); Dirk Gollub, Karbach (DE); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 12/947,432

(22) Filed: Nov. 16, 2010

(65) Prior Publication Data

US 2011/0172866 A1 Jul. 14, 2011

(30) Foreign Application Priority Data

Nov. 18, 2009 (DE) .................. 10 2009 046 832

(51) Int. Cl.
*B60W 20/00* (2006.01)
*B60L 3/00* (2006.01)

(52) U.S. Cl.
CPC .................................. *B60L 3/00* (2013.01)
USPC ........ 701/22; 701/70; 477/9; 477/62; 318/52; 318/778; 318/806; 303/15; 303/20; 303/89; 303/155; 303/193

(58) Field of Classification Search
CPC ..... B60W 20/00; B60W 10/08; B60W 10/06; Y02T 10/6286; B60K 6/445
USPC ........... 701/22, 39, 70, 84, 67, 55, 54, 53, 51; 192/1.43, 1.25, 1.37, 1.55, 65.1; 303/122.03, 122, 122.08, 122.1, 303/122.14, 15; 318/364, 371, 778, 52, 34, 318/140, 139; 477/9, 62, 5, 70, 3, 43; 700/299; 60/288, 608
See application file for complete search history.

(56) References Cited

U.S. PATENT DOCUMENTS

| | | | | |
|---|---|---|---|---|
| 5,139,121 A | * | 8/1992 | Kumura et al. | 477/9 |
| 5,923,096 A | * | 7/1999 | Manak | 307/10.1 |
| 7,419,455 B2 | * | 9/2008 | Hardtle et al. | 477/93 |
| 7,673,949 B2 | * | 3/2010 | Kuramochi et al. | 303/122.03 |
| 7,988,592 B2 | * | 8/2011 | Choi | 477/3 |
| 8,041,475 B2 | * | 10/2011 | Fujita et al. | 701/30.3 |
| 2002/0088653 A1 | * | 7/2002 | Takamoto et al. | 180/65.1 |
| 2004/0124697 A1 | * | 7/2004 | MacGregor et al. | 303/89 |
| 2006/0124697 A1 | | 6/2006 | Stevenson et al. | |

(Continued)

FOREIGN PATENT DOCUMENTS

| | | |
|---|---|---|
| CN | 1906061 | 1/2007 |
| JP | 11288316 A * | 10/1999 |

OTHER PUBLICATIONS

JP11288316_NPL_east.*

*Primary Examiner* — Helal A Algahaim
*Assistant Examiner* — Jelani Smith
(74) *Attorney, Agent, or Firm* — Kenyon & Kenyon LLP

(57) ABSTRACT

A method for operating an electric vehicle, the electric vehicle having an electric motor and a brake device, and the electric motor and the brake device being capable of being influenced by a control device. When the electric vehicle is at a standstill, when there is an error of the control device, the brake device is actuated so that the electric vehicle cannot move, or at least can move only to a very limited extent.

16 Claims, 1 Drawing Sheet

(56) References Cited

U.S. PATENT DOCUMENTS

| | | |
|---|---|---|
| 2006/0152074 A1 | 7/2006 | Chico et al. |
| 2006/0163939 A1 | 7/2006 | Kuramochi et al. |
| 2008/0262687 A1* | 10/2008 | Fujita et al. ................ 701/70 |
| 2009/0107740 A1* | 4/2009 | Bell et al. .................. 180/65.1 |
| 2009/0143951 A1* | 6/2009 | Takahashi et al. ........... 701/70 |
| 2009/0250996 A1* | 10/2009 | Glaeske et al. ............ 303/9.68 |
| 2011/0144876 A1* | 6/2011 | Miah .............................. 701/70 |
| 2011/0172869 A1* | 7/2011 | Bell et al. ..................... 701/22 |

\* cited by examiner

METHOD FOR OPERATING AN ELECTRIC VEHICLE

BACKGROUND INFORMATION

As is known, electric vehicles are driven by an electric motor that is for example supplied with power by a battery. The rotational speed of the electric motor, and thus the speed of the electric vehicle, is monitored by an electronic control device and is controlled and/or regulated in the desired manner. In particular, the electric motor is switched off when the electric vehicle is to be brought to a standstill or is to remain at a standstill.

If an error occurs in the control device during such a standstill of the electric vehicle, it is possible for the electric motor to briefly produce a torque that causes an undesired movement of the electric vehicle. In order to avoid accidents, in this case it is required that, even given an error in the control device, an electric vehicle at a standstill must not be permitted to execute a movement greater than 10 cm.

SUMMARY OF THE INVENTION

In the method according to the present invention, it is assumed that the electric vehicle is at a standstill. If, during this standstill, an error occurs in the control device, it is provided that a brake device is actuated so that the electric vehicle cannot move, or at least can move only to a very limited extent. In this way, it is ensured that even when there is an error of the control device the stationary electric vehicle will not make any movement greater than 10 cm.

It is particularly advantageous if a disk brake or a wheel brake or a gear lock or the like is provided as a brake device. This device should preferably be capable of being activated electrically. This makes it possible to use already-existing brake devices of the electric vehicle in order to realize the present invention.

In an advantageous realization, the method according to the present invention is carried out independent of the control device. In this way it is achieved that the method can still be carried out even if the control device is for example completely out of operation.

DETAILED DESCRIPTION

Figure 1:
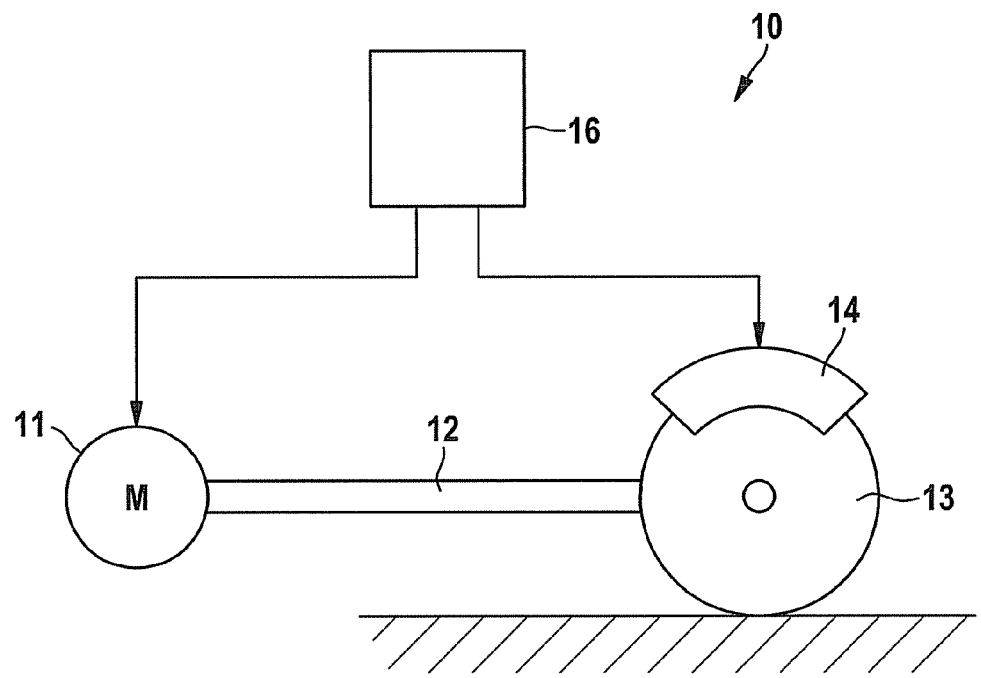
FIG. 1 shows a schematic switching diagram of an electric vehicle according to the present invention.

FIG. 1 shows a part of an electric vehicle 10, namely its electric motor 11, by which a wheel 13 of electric vehicle 10 can be driven via a drive shaft 12. Wheel 13 is for example provided with a brake device 14. In addition, a control device 16 is present that is capable of influencing electric motor 11 and brake device 14. In particular, control device 16 contains a microprocessor that is programmed in such a way that electric motor 11 produces a torque that acts on drive shaft 12 and that results in a desired speed of electric vehicle 10. In addition, control device 16 is fashioned in such a way that it actuates brake device 14 so that electric vehicle 10 can be braked thereby.

Alternatively, it is possible for control device 16 to be fashioned as a higher-order vehicle guidance computer, and for an additional control device to be connected between this higher-order control device 16 and electric motor 11, and/or between control device 16 and brake device 14. The intermediately connected control devices can then be oriented specifically to the devices that are to be controlled in each case, for example in the form of a special braking control device for controlling brake device 14.

If electric vehicle 10 is to be brought to a standstill or is to remain at a standstill, electric motor 11 is shut off by control device 16. This means that electric motor 11 is controlled by control device 16 in such a way that electric motor 11 no longer produces a torque at drive shaft 12. This has the consequence that wheel 13 is no longer driven, so that, as desired, the electric vehicle comes to a standstill and remains at a standstill.

This influencing of electric motor 11 by control device 16 is independent of any additional braking that may be present of electric vehicle 10 using any other brake devices.

It is possible that an error may occur in control device 16 that causes electric motor 11 to produce a torque that would then cause an undesired movement of the electric vehicle. In order to prevent such an undesired movement, the method explained in the following is provided.

Figure 2:
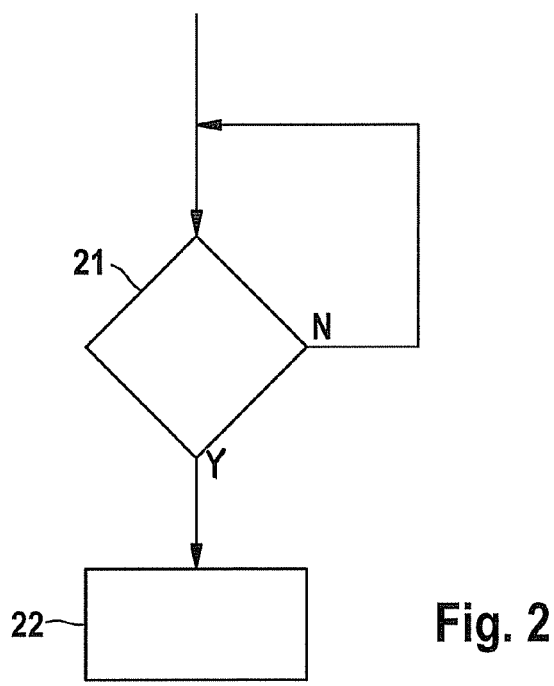
FIG. 2 shows a schematic flow diagram of an exemplary embodiment of a method according to the present invention for operating the electric vehicle shown in FIG. 1.

In the method illustrated in FIG. 2, it is assumed that electric vehicle 10 is at a standstill. This means that, as mentioned, electric motor 11 is switched off. It is further assumed that brake device 14 has not been actuated by the driver, or has been actuated only to a slight extent by the driver, so that electric vehicle 10 is at an unbraked standstill.

In a step 21, it is continuously determined whether control device 16 is operating without error. This determination can be made using known measures. In particular, an error of control device 16 can be determined if electric vehicle 10 executes an undesired movement, or if electric motor 11 outputs a torque, although electric vehicle 10 is in both cases supposed to remain at a standstill.

If no error is present, then, as mentioned, step 21 is continuously repeated. If, on the other hand, an error is recognized, in a step 22 brake device 14 is actuated. Due to the continuous execution of step 21, and due to a processing speed of steps 21 and 22 that is as high as possible, it can be ensured that the actuation of the brake device takes place so quickly in terms of time that, despite the present torque of electric motor 11, electric vehicle 10 does not move, or moves only to a very limited extent.

Of course, brake device 14 can be any device of electric vehicle 10 that is suitable for holding electric vehicle 10 at a standstill. In addition, this device should be capable of being activated electrically to the greatest possible extent. For example, this device can be a disk brake coupled to wheel 13, or, as is shown as an example in FIG. 1, can be a wheel brake, or can be a gear lock of a gear that is connected in rotationally fixed fashion to wheel 13, or can be the simultaneous actuation of both clutches of a double-clutch transmission connected in rotationally fixed fashion to wheel 13, or the like.

If, contrary to the above-stated assumption, electric vehicle 10 is not at an unbraked standstill, so that electric vehicle 10 is braked in some way in the existing standstill and is thereby held stationary, to this extent a movement of electric vehicle 10 should then not be possible. In this case, the method explained above results in increased safety only in that a movement of electric vehicle 10 is not possible under any circumstances.

The method as recited in FIG. 2 can be executed by control device 16 or by a higher-order control device or by an intermediately connected control device. Alternatively, it is possible for the method to be executed by a device that is independent of control device 16 and that is able to actuate brake device 14. This device can for example be an additional microprocessor or a so-called ASIC. In this case, the method illustrated in FIG. 2 can also still be executed if for example the microprocessor of control device 16 is completely out of operation. It is also possible for a plurality of hardware and software levels to be realized in control device 16, for example a functional level and a monitoring level, and for the method illustrated in FIG. 2 to be present in the monitoring level. Thus, if an error is present in the functional level, the described method can continue to be executed by the monitoring level.

What is claimed is:

1. A method for operating an electric vehicle, the electric vehicle having an electric motor and a brake device, the electric motor and the brake device being capable of being influenced by a control device, the method comprising:
   switching off the electric motor by the control device, which is for controlling the electric motor, to bring the electric vehicle to a standstill;
   subsequent to the switching off of the electric motor and subsequent to the electric vehicle reaching a standstill, continuously checking whether the control device is operating without error; and
   during the standstill of the electric vehicle, when there is an error of the control device, actuating the brake device so that the electric vehicle can move at most to a very limited extent;
   wherein the control device monitors and regulates a rotational speed of the electric motor.

2. The method according to claim 1, further comprising:
   determining the error of the control device, wherein the error of the control device causes the electric vehicle to execute a movement during the standstill before the brake device is actuated.

3. The method according to claim 1, further comprising:
   determining the error of the control device, wherein the error of the control device causes the electric motor to output a torque during the standstill before the brake device is actuated.

4. The method according to claim 1, wherein the brake device includes at least one of a disk brake, a wheel brake and a gear lock.

5. The method according to claim 1, wherein the method is executed independently of the control device.

6. The method according to claim 1, wherein after the brake device is actuated the electric vehicle does not move more than 10 cm.

7. The method according to claim 1, wherein the control device controls an electrical drive motor.

8. A computer-readable non-transitory medium having a computer program, which is executable by a processor, comprising:
   a program code arrangement having program code for operating an electric vehicle, the electric vehicle having an electric motor and a brake device, the electric motor and the brake device being capable of being influenced by a control device, by performing the following:
   switching off the electric motor by the control device, which is for controlling the electric motor, to bring the electric vehicle to a standstill;
   subsequent to the switching off of the electric motor and subsequent to the electric vehicle reaching a standstill, continuously checking whether the control device is operating without error;
   during the standstill of the electric vehicle, when there is an error of the control device, actuating the brake device so that the electric vehicle can move at most to a very limited extent,
   wherein the control device monitors and regulates a rotational speed of the electric motor.

9. The computer-readable non-transitory medium according to claim 8, wherein after the brake device is actuated the electric vehicle does not move more than 10 cm.

10. The computer-readable non-transitory medium according to claim 8, further comprising:
    determining the error of the control device, wherein the error of the control device causes the electric vehicle to execute a movement during the standstill before the brake device is actuated.

11. The computer-readable non-transitory medium according to claim 8, further comprising:
    determining the error of the control device, wherein the error of the control device causes the electric motor to output a torque during the standstill before the brake device is actuated.

12. The computer-readable non-transitory medium according to claim 8, wherein the brake device includes at least one of a disk brake, a wheel brake and a gear lock.

13. A control device for operating an electric vehicle, the electric vehicle having an electric motor and a brake device, comprising:
    an arrangement for performing the following:
    switching off the electric motor by the control device, which is for controlling the electric motor, to bring the electric vehicle to a standstill;
    subsequent to the switching off of the electric motor and subsequent to the electric vehicle reaching a standstill, continuously checking whether the control device is operating without error;
    during the standstill of the electric vehicle, when there is an error of the control device, actuating the brake device so that the electric vehicle can move at most to a very limited extent,
    wherein the control device monitors and regulates a rotational speed of the electric motor.

14. The control device according to claim 13, wherein after the brake device is actuated the electric vehicle does not move more than 10 cm.

15. The control device according to claim 13, wherein the brake device includes at least one of a disk brake, a wheel brake and a gear lock.

16. A method for operating an electric vehicle while the electric vehicle is substantially at a standstill, the electric vehicle having an electric motor, a brake device, and a control device, the method comprising:
    continuously checking whether an error has occurred in the control device; and
    responsive to the detection of an error in the control device, actuating the brake device such that the electric vehicle can move at most to a very limited extent;
    wherein the control device monitors and regulates a rotational speed of the electric motor.

* * * * *